United States Patent
Curbera et al.

(10) Patent No.: US 8,856,809 B2
(45) Date of Patent: Oct. 7, 2014

(54) CONTROLLING NAVIGATION OF APPLICATION LOGIC USING ANNOTATED APPLICATION CODE

(75) Inventors: Francisco Phelan Curbera, Hastings-On-Hudson, NY (US); Matthew J. Duftler, Mahopac, NY (US); Michael Levi Fraenkel, Pittsboro, NC (US); Rania Y. Khalaf, Cambridge, MA (US); Axel Martens, White Plains, NY (US); Johannes Riemer, Vienna (AT); Gal Shachor, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 1773 days.

(21) Appl. No.: 12/051,629

(22) Filed: Mar. 19, 2008

(65) Prior Publication Data

US 2009/0241128 A1   Sep. 24, 2009

(51) Int. Cl.
*G06F 9/54* (2006.01)
*G06F 9/44* (2006.01)

(52) U.S. Cl.
CPC . *G06F 9/547* (2013.01); *G06F 8/73* (2013.01)
USPC .......................... 719/320; 717/133; 717/157

(58) Field of Classification Search
CPC ..... G06F 11/3608; G06F 11/28; G06F 9/547; G06F 8/73
See application file for complete search history.

(56) References Cited

U.S. PATENT DOCUMENTS

| | | | |
|---|---|---|---|
| 2003/0023957 A1* | 1/2003 | Bau et al. ................. | 717/140 |
| 2003/0041288 A1* | 2/2003 | Kolawa et al. ................ | 714/38 |
| 2005/0240863 A1 | 10/2005 | Olander et al. | |
| 2006/0161833 A1* | 7/2006 | Chandra et al. ............... | 714/763 |
| 2007/0083853 A1 | 4/2007 | Cook et al. | |
| 2007/0174762 A1 | 7/2007 | Plant | |
| 2008/0184202 A1* | 7/2008 | Wirfs-Brock et al. ........ | 717/121 |
| 2008/0209001 A1* | 8/2008 | Boyle et al. ................ | 709/207 |

OTHER PUBLICATIONS

Yoonsik Cheon, Specifying and checking method call sequence in JML, Feb. 2005, CSREA Press, pp. All.*
Duan et al., "A Model for Abstract Process Specification, Verification and Composition", ICSOC'04, Nov. 15-19, 2004, NY, ACM 2004, pp. 232-241.

* cited by examiner

*Primary Examiner* — H S Sough
*Assistant Examiner* — Syed Roni
(74) *Attorney, Agent, or Firm* — Yee & Associates, P.C.; William Stock

(57) ABSTRACT

A computer implemented method, apparatus, and computer usable program product for processing application code. In one embodiment, a call is received to invoke a set of methods of annotated application code. The annotated application code includes a set of annotations specifying a selection of the set of methods. A selected method from the set of methods is invoked in response to determining that the call is valid according to the set of annotations. Thereafter, a subsequent set of valid methods for execution is identified based upon an annotation associated with the selected method.

17 Claims, 11 Drawing Sheets

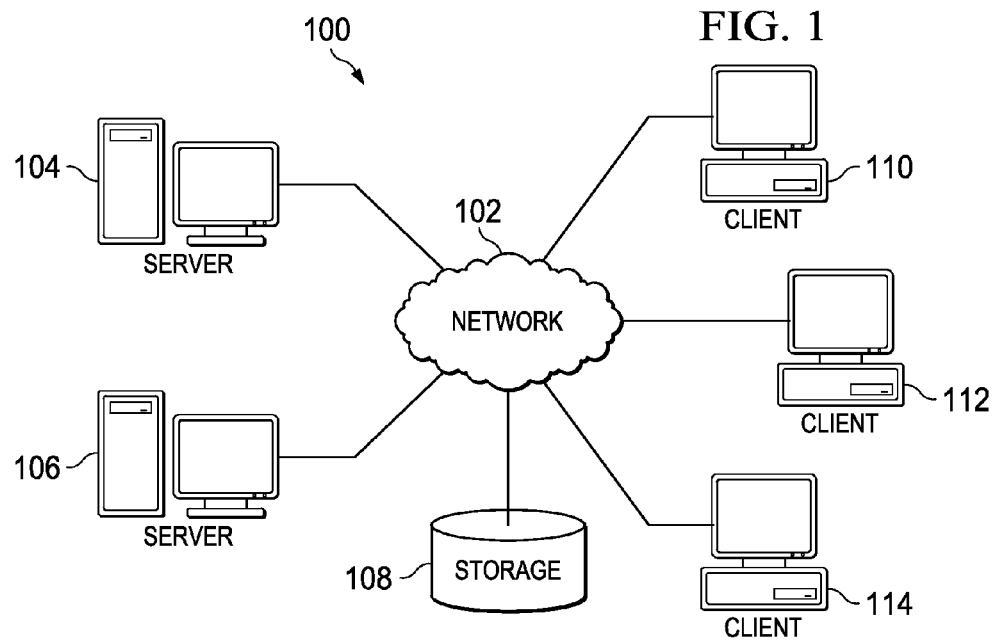
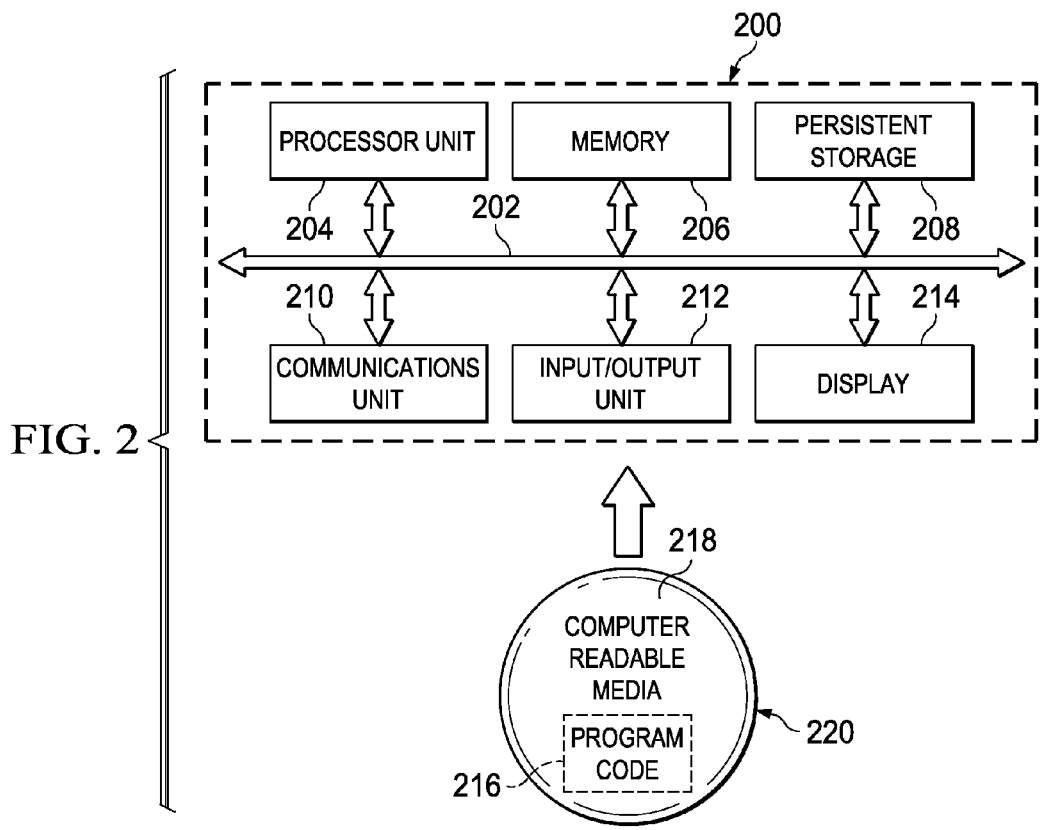

@ CONTINUE (PICK = {"OPERATION 1", "OPERATION 2"}, CONDITION = "CONDITION 1")
   502        504              506                              508

@ CONTINUE (NEXT = "OPERATION 3", CONDITION = "CONDITION 2")
   602        604         606                    608

```
public class OrderApprovalProcess {
    // Global variables to be used in conditions
    private boolean itemValueBelowThreshold;
    private boolean itemAvailable;
```

702
```
    @Start
    @Continue(pick={"reject1", "approve1", "askForInfo1"})
    public void request(Item item) {
        // set boolean variable used for later routing decision
        itemValueBelowThreshold = (item.getValue() >= 1000);
    }
```

704
```
    // End state
    public void reject1(String reason) { /* Java implementation */ }
```

706
```
    @Fork({
        @Continue(pick={"order"}, condition="itemValueBelowThreshold"),
        @Continue(pick={"reject2", "approve2", "askForInfo2"})
    })
    public void approve1(String projectCode) {
        if (itemValueBelowThreshold) {
            // Java implementation of internal transition to Approval pending
        }
        else {
            // Java implementation of internal transition to Request approved
        }
    }
```

708
```
    @Continue(pick={"provideInfo1"})
    public void askForInfo1(String question) { /* Java implementation */ }
```

710
```
    @Continue(pick={"reject1", "approve1", "askForInfo1"})
    public void provideInfo1(String response) { /* Java implementation */ }
```

712
```
    // End state
    public void reject2(String reason) { /* Java implementation */ }
```

TO FIG 7B

FROM FIG 7A

714 {
```
@Continue(pick={"order"})
public void approve2(String departmentCode) { /* Java implementation */ }
```

716 {
```
@Continue(pick={"provideInfo2"})
public void askForInfo2(String question) { /* Java implementation */ }
```

718 {
```
@Continue(pick={"reject2", "approve2", "askForInfo2"})
public void provideInfo2(String response) { /* Java implementation */ }
```

720 {
```
@Fork({
        @Continue(pick={"registerItem"}, condition="itemAvailable")
        // Otherwise end state
})
public void order(Item item) {
        // set boolean variable used for later routing decision
        itemAvailable = item.isAvailable();
        if (itemAvailable) {
                // Java implementation of internal transition to Item supplied
        }
        else {
                // Java implementation of internal transition to User informed
        }
}
```

722 {
```
// End state
public void registerItem(Item item) { /* Java implementation */ }
}
```

CONTROLLING NAVIGATION OF APPLICATION LOGIC USING ANNOTATED APPLICATION CODE

BACKGROUND OF THE INVENTION

1. Field of the Invention

The embodiment of the present invention relates generally to an improved data processing system and in particular to a computer implemented method and apparatus for processing application code. More particularly, the embodiment of the present invention is directed to a computer implemented method, apparatus, and computer usable program product for enforcing abstract processes on web applications using annotated application code.

2. Description of the Related Art

Application logic is the computational aspects of an application, including a list of instructions that tells a software application how to operate. Application logic may be thought of as a collection of operations that may be invoked by a user. In some instances, for software applications to function properly, the operations may be required to be invoked in a particular order. This requirement is particularly relevant to software applications operable by human users. For example, a software application for a retail website may include operations for displaying a list of retail items for a user's review, for enabling a user to place a selected retail item into a virtual shopping cart, and for checking out. In this example, the user of the online retail website would be unable to check out without having first placed a retail item into the virtual shopping cart. Thus, enforcing an order for calling the operations of the software application for the retail website allows the underlying software application to function properly.

Sequencing constraints are rules that limit the order in which the operations of a software application may be called. One currently used method for introducing sequencing constraints is the use of a workflow programming model. A workflow programming model provides the sequencing of operations of an underlying software application. An example of a workflow programming model is WS-BPEL. However, a notable problem regarding the use of a workflow programming model is the limited applicability to other applications types and domains. For example, different types of software applications may benefit from specialized programming models. Consequently, a unique programming model may not adequately address the requirements of all application types and domains.

Another currently used method for introducing sequencing constraints involves the integration of a continuation capability in the programming language. This capability is provided by Cocoon FlowScript, which is available from the Apache Software Foundation. Cocoon implements a sequential programming model that enables the identification of certain steps of code as "continuations." The continuations are associated with a specific user action. The sequential nature of the code enforces the sequence of user interactions with the software. A common problem associated with Cocoon is that the Cocoon model is tied to one specific programming model. As such, Cocoon has no general applicability to other more common models, such as standard object oriented development.

The use of a separately defined process representation that refers to operations written in a lower level programming language is yet another currently used method for introducing sequencing constraints. This method involves the use of metadata external to the application logic that may be processed to limit the order in which operations may be called. This capability may be provided by Spring WebFlow, an open source project, which is available from SpringSource. However, this approach involves the use of external metadata, which requires maintaining additional artifacts external to the application code. Notably, Spring WebFlow introduces additional complexity to the development and update of processes.

SUMMARY OF THE INVENTION

The illustrative embodiments described herein provide a computer implemented method, apparatus, and computer usable program product for processing application code. The process receives a call to invoke a set of methods of annotated application code. The annotated application code includes a set of annotations specifying a selection of the set of methods. The process then invokes a selected method from the set of methods in response to determining that the call is valid according to the set of annotations. Thereafter, the process identifies a subsequent set of valid methods for execution based upon an annotation associated with the selected method.

BRIEF DESCRIPTION OF THE DRAWINGS

FIG. 1 is a pictorial representation of a network data processing system in which illustrative embodiments may be implemented;

FIG. 2 is a block diagram of a data processing system in which the illustrative embodiments may be implemented;

FIGS. 7A-7B are an illustrative annotated class in accordance with an illustrative embodiment;

DETAILED DESCRIPTION OF THE INVENTION

Figure 3:
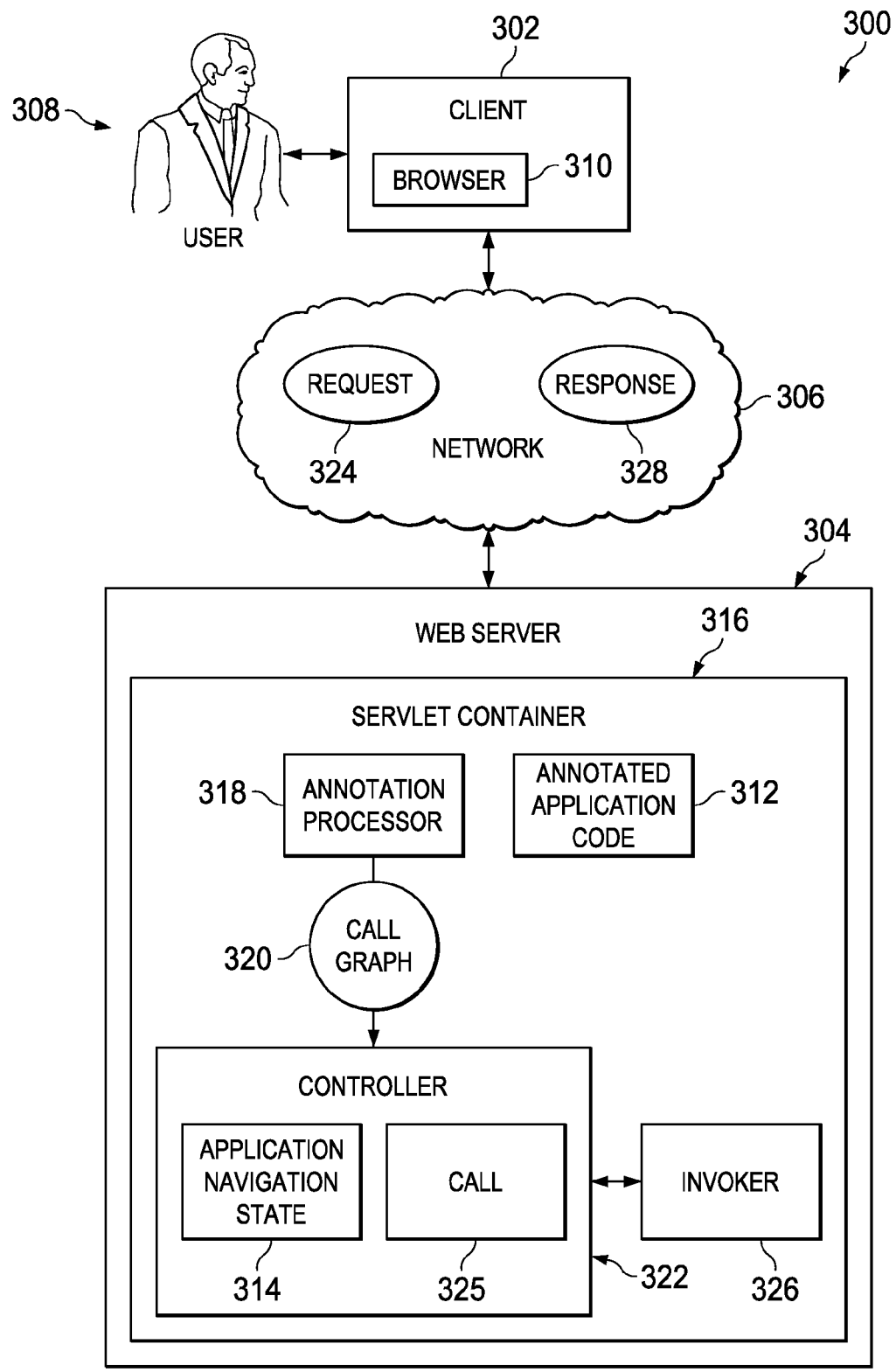
FIG. 3 is a diagram of a data processing system for enforcing sequencing constraints in application code in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computing devices in which embodiments may be implemented. Network data processing system 100 contains network 102, which is the medium used to provide communications links between various devices and computers connected together within network data processing system 100. Network 102 may include connections, such as wire, wireless communications links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for accessing content from a Java™-based web application in accordance with an illustrative embodiment. The web application may be hosted by a server, such as server 104. Communication between a client and server may occur over a network, such as network 102.

Clients 110, 112, and 114 may be, for example, a personal computer, a laptop, a tablet PC, a network computer, a hard-wired telephone, a cellular phone, a voice over internet communications device, or any other communications device or computing device capable of transmitting and/or processing data. In the depicted example, server 104 provides data, such as boot files, operating system images, and applications to clients 110, 112, and 114. Clients 110, 112, and 114 are coupled to server 104 in this example. Network data processing system 100 may include additional servers, clients, computing devices, and other devices. The clients and servers of network data processing system 100 may be used to provide a user operating a client, such as client 110, with hypertext markup language (HTML) webpages. The webpages may include selectable options navigable by a user in accordance with a set of sequencing constraints introduced by annotated application code. The annotated application code may be stored in a web server, such as server 104.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as, for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, memory 206 or a cache. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

Currently used methods for introducing sequencing constraints are undesirable because of the lack of general applicability to other application types and programming models. In addition, at least one currently used method increases the complexity of application development. Increased complexity increases the likelihood of error, particularly with respect to potential inconsistencies between the code and the constraint specification. Consequently, what is needed is a method and apparatus to provide sequencing constraints at the application code level.

The illustrative embodiments described herein provide a computer implemented method, apparatus, and computer usable program product for processing application code. The process receives a call to invoke a set of methods of annotated application code. As used herein, a set is one or more. Thus, a set of methods may be one or more methods.

The annotated application code includes a set of annotations specifying the criteria for selecting the set of valid methods available for invocation. The process then invokes a selected method from the set of methods in response to determining that the call is valid according to the set of annotations. Thereafter, the process identifies a subsequent set of valid methods for execution based upon an annotation associated with the selected method.

The annotations of the annotated application code include at least one of a start annotation, a continue annotation, and a grouping annotation. In other words, the annotated application code may include either a start annotation, a continue annotation, or a grouping annotation, or any combination of the three. The annotations introduce sequencing constraints that identify the set of valid methods available for invocation.

A method having a start annotation may be invoked to initiate a process. Continue annotations identify a set of methods that may be invoked during the processing of the annotated application. Continue annotations may be an internal choice annotation or an external choice annotation. An external choice annotation identifies a set of methods whose invocation depends upon a selection by a user. An internal choice is an annotation that identifies a set of methods whose invocation is not directly attributable to a user selection, but is determined by internal data values accessible to the executing code.

For example, a user may select one of a group of external choice methods for execution. After execution of the user-selected method, the process may automatically identify the subsequent method for execution without additional input from the user. The identification may be made based on a result generated by a prior method invocation available to the executing code. The subsequent method is thus identified through an internal choice annotation.

A third type of annotation is a grouping annotation. The grouping annotation is an annotation that identifies two or more continue annotations that may be invoked.

The annotations may be used to facilitate the determination of the validity of a method call. In response to determining that the call is valid, the process invokes one of the methods of the annotated code. Thereafter, the process identifies a subsequent set of valid methods for execution based upon annotations of the methods that have been invoked.

In one embodiment, in response to determining that the call is valid, the process generates and updates a representation of a navigation state of the annotated application. The navigational state is then used to validate subsequent calls. If those calls are calls to annotated methods, the process updates the navigational state using the annotations of the subsequently called methods.

FIG. 3 is a diagram of a data processing system for controlling the navigation of application logic using annotated application code in accordance with an illustrative embodiment. Data processing system 300 is a data processing system, such as network data processing system 100 in FIG. 1. In this illustrative example, data processing system 300 includes client 302 and web server 304. Client 302 is a client, such as client 110 in FIG. 1. Web server 304 is a server, such as server 104 in FIG. 1. Client 302 communicates with web server 304 via network 306. Network 306 is a network, such as network 102 in FIG. 1.

User 308 operates browser 310 to navigate a web application having annotated application code. Browser 310 is a software application used to search a collection of data in a network data processing system. Browser 310 may enable user 308 to display and interact with collections of data, such as text, images, videos, music, and other information. This information may be presented by browser 310 over a network, such as the Internet or a local area network. Browser 310 may be, for example, Mozilla Firefox®, Internet Explorer®, or Netscape Navigator®. Mozilla Firefox is a registered trademark of Mozilla Corporation. Internet Explorer is a registered trademark of Microsoft Corporation. Netscape Navigator is a registered trademark of Netscape Communications Corporation.

Annotated application code 312 is application code having a set of annotations for introducing sequencing constraints for enforcing an order in which methods of annotated application code 312 may be called. An example of annotated application code 312 is provided in FIG. 4. In an illustrative embodiment, annotated application code 312 may be a class in an object oriented programming language. The object oriented programming class may be, for example, a Java™ class. However, the annotations described herein are not limited to object oriented programming. Annotations may be applied to other programming languages.

The actual implementation of annotated application code 312 may be considered as a set of states through which annotated application code 312 sequences. Consequently, the state in which annotated application code 312 may be during any given time may be represented by application navigation state 314. Application navigation state 314 is a data structure stored in memory that represents a current state of annotated application code 312.

In this example in FIG. 3, annotated application code 312 is loaded into servlet container 316. Servlet container 316 is a web server component that facilitates the execution of web applications. Servlet container 316 combines the basic functionality of a web server with Java™/servlet specific optimizations and extensions, such as an integrated Java™ runtime environment, and the ability to automatically translate specific uniform resource locators into servlet requests. Individual servlets are registered with servlet container 316, providing servlet container 316 with information about the functionality of individual servlets, and what uniform resource locator or other resource locater will be used to identify the servlets.

Annotation processor 318 is a servlet container component that processes annotated application code 312. In particular, once annotated application code 312 is loaded into servlet container 316, annotation processor 318 generates call graph 320 from annotated application code 312. Call graph 320 is a graph that embodies the specified sequencing constraints of annotated application code 312. In particular, call graph 320 describes the control flow of annotated application code 312. After generation, annotation processor 318 sends call graph 320 to controller 322.

Controller 322 is a servlet container component for enforcing the sequencing constraints of annotated application code 312. In particular, controller 322 enforces the sequencing constraints by validating calls to a process and rejecting calls that fail to satisfy the sequencing constraints. Calls that satisfy the sequencing constraints are processed further. The calls to the process are specified in request 324. Request 324 is a message sent between a client and server through network 306. Request 324 may include information from which call 325 to method may be derived.

Call 325 is a message specifying a method name and optionally, parameters that may be required by the method. The method name and parameters may be derived from information included within request 324 generated at client 302. Controller 322 uses call 325 to identify methods from annotated application code 312 for invocation.

Controller 322 validates calls by maintaining and referencing application navigation state 314. Application navigation state 314 may be, in one embodiment, encoded as a data graph structure with nodes comprising a "start" node and a node for each possible method call. The nodes may be connected with edges representing the allowed transitions between the call to one method and the next, according to the code annotations. Application navigation state 314 may provide the name of the last method executed, if any. In addition, application navigation state 314 may identify the "start" method, if a method has not been previously called. Further, application navigation state 314 may identify the values of any data variables relevant to the code annotations.

Controller 322 creates application navigation state 314 upon receiving request 324 that specifies an initial, valid call to a method of an annotated application. If annotations on a method invoked by request 324 specify a subsequent, valid call to another method, controller 322 updates application navigation state 314. Application navigation state 314 may then be used to validate subsequent calls. Thus, in response to receiving request 324, controller 322 identifies from request 324 a call to a method. Controller 322 validates the call by determining whether the called method corresponds to a navigation state of the set of annotations of the annotated application as set forth in application navigation state 314. After execution of each method, controller 322 updates application navigation state 314 according to annotations on the called method.

If the set of calls of request 324 are invalid, then controller 322 may return one or more predefined error messages. The error messages may include, for example, an error message indicating that a newly received call cannot be handled. The newly received call cannot be handled when an application is in the middle of processing a method and thus, the system is unable to determine whether the newly received call can be accepted.

Another error message that may be returned is an invalid call message. An invalid call message is an error message that is sent back to a caller if the newly received call violates the sequencing constraints of the annotated application. Other error messages may be stored and presented depending upon the particular implementations.

If request 324 includes a valid call, then controller 322 delegates request 324 to invoker 326. Invoker 326 is a servlet container component that matches unique resource identifiers and other parameters of request 324 to appropriate classes and methods. In addition, invoker 326 performs dynamic invocation. Dynamic invocation is the invocation of a method, which is determined at execution time. Thus, the method being invoked is not known at the time the code was developed and compiled. In one illustrative embodiment, invoker 326 may perform dynamic invocation by using Java™ reflection. Java™ reflection is a mechanism by which an application's code is able to discover the properties and capabilities of a software artifact.

Invoker 326 returns the result of the operation to controller 322. Controller 322 then identifies a subsequent set of valid methods for execution based upon the result received from invoker 326. Controller 322 generates response 328 using the returned information. In this illustrative example, response 328 is a hypertext markup language webpage that provides a result of the processing, or the available options that may be selected by user 308. The user interacts with the links presented in response 328 to generate a new request that is returned to controller 322.

In an illustrative example, annotated application code 312 is deployed into servlet container 316. Annotation processor 318 generates call graph 320 from annotated application code 312. Controller 322 maintains call graph 320 in memory to expose the form-based unique resource identifiers that clients may reference to interact with the application.

Controller 322 then identifies a set of methods of annotated application code 312 which may be called. If no prior call to annotated application code 312 has been made, the set of methods that may be called are those methods having a start annotation.

Upon receiving request 324 from client 302, controller 322 validates the set of method calls from request 324. If the calls of request 324 are validated, then controller 322 processes a call to a selected method of the set of method calls by passing request 324 to invoker 326 for invoking the actual object oriented programming method with the appropriate parameters from request 324. The object oriented programming class may be a Java™ class. In the event that request 324 cannot be validated, controller 322 returns an error message to client 302.

Invoker 326 returns to controller 322 the result of processing the selected method. Thereafter, controller 322 identifies a subsequent set of valid methods of annotated application code 312 which may be called based upon an annotation associated with the selected method. The subsequent set of valid methods is the methods associated with continue annotations of the selected method whose execution recently completed. For example, the continue annotations may have a pick attribute specifying a set of external choice operations that may be subsequently called. Alternatively, the continue annotations may include a next attribute specifying an internal choice. The subsequent method call is processed in a manner depending upon the type of continue annotation that is present in the selected method.

If the call is to an internal choice method, then controller 322 requests invoker 326 to process the call. If the call is to an external choice method, then controller 322 may process the method call by generating response 328 provided to user 308 for calling the subsequent method. This process continues until controller 322 encounters a method lacking a continue annotation.

In the event that the method includes a grouping annotation, controller 322 determines which continue annotations from the group may be activated based upon the satisfaction of the specified conditions. The conditions are conditions such as conditions 508 in FIG. 5. Controller 322 requests invoker 326 to evaluate the specified conditions to determine the first continue operation that satisfies the stated conditions. Thereafter, controller 322 may generate response 328 to return to user 308, which lists a set of operations that may be selected by user 308 for identifying the next operation for invocation.

Figures 4, 5, 6:
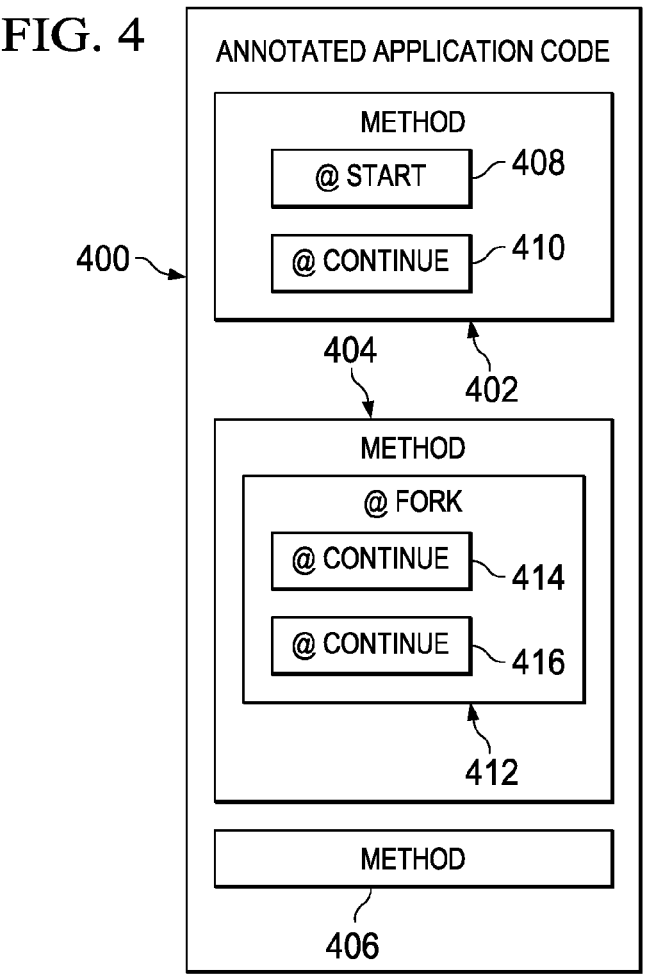
FIG. 4 is a simplified annotated class having sequencing constraints in accordance with an illustrative embodiment.
FIG. 5 is a continue annotation having a pick attribute in accordance with an illustrative embodiment.
FIG. 6 is a continue operation having a next attribute in accordance with an illustrative embodiment.

FIG. 4 is a simplified block diagram of an annotated application code in accordance with an illustrative embodiment. In particular, FIG. 4 depicts annotated application code 400, which is an annotated application code, such as annotated application code 312 in FIG. 3. Annotated application code 400 includes three methods, method 402, 404, and 406.

Method 402 is a method that may be called in order to initiate the process of annotated application code 400. In this illustrative example, method 402 is the only method that may be called to initiate the process of annotated class 402 because method 402 includes start annotation 408. Start annotation 408 is an annotation of a method that identifies the method as a method that may be called to initiate a process. Multiple methods may be annotated with a start annotation. In the illustrative example in FIG. 4, start annotation 408 is depicted as "@Start."

Method 402 also includes continue annotation 410. Continue annotation 410 is an annotation of a method identifying a set of operations that may be invoked in method 402. Continue annotations of annotated application code 400 are depicted as "@Continue." Methods lacking a continue annotation, such as method 406, terminate the process when encountered by a controller, such as controller 322 in FIG. 3. Continue annotations are discussed in more detail in FIGS. 5 and 6.

Method 404 includes grouping annotation 412. In this illustrative example, grouping annotation 412 is depicted as "@Fork." Grouping annotation 404 is an annotation of a method containing two or more continue annotations, each of which identifies a set of operations. In this example, grouping annotation 412 groups continue annotations 414 and 416. A controller evaluates each continue annotation from top to bottom, in the order that the continue annotations are listed within the grouping annotation. Thus, a controller would evaluate continue annotation 414 to determine whether specified conditions are satisfied. If the conditions are satisfied, then the operation associated with continues annotation 414 will be invoked. If, however, the conditions of continue annotation 414 are not satisfied, then the controller evaluates the conditions associated with continue annotation 416.

FIG. 5 is a continue annotation having a pick attribute in accordance with an illustrative embodiment. Continue annotation 502 includes pick attribute 504. Pick attribute 504 is an attribute that identifies a set of external choices 506 that a user may invoke. In this illustrative example, a set of external choices 506, which includes operation 1 and operation 2, is one or more methods that may be selected by a user for execution. In other embodiments, a set of external choices 506 may include as few as one operation or more than two operations.

Continue annotation 502 includes condition 508. Condition 508 is a condition that should exist before a selection of operations from a set of external choices 506 is made. Condition 508 may be any type of condition that must evaluate to a Boolean value.

A continue annotation having a pick attribute indicates that a user's input is required to cause the invocation of the operation assigned to the continue annotation. For example, a user's selection of either operation 1 or operation 2 causes a controller to initiate processing of the selected operation, provided that condition 508 of continue annotation 502 is satisfied. A pick attribute may also identify a single operation that the user must affirmatively select in order to invoke the operation associated with that continue annotation. For example, if a set of external choices 506 included only operation 1, a controller would not initiate processing of operation 1 without a user's input. The user's input may include, for example, clicking a link or button presented to the user in a webpage.

FIG. 6 is a continue operation having a next attribute in accordance with an illustrative embodiment. Continue annotation 602 includes next attribute 604. Next attribute 604 is an attribute that identifies exactly one operation for invocation once a currently executing method terminates. Internal choice 606 is a single operation that is invoked upon termination of a currently executing method. A user is not provided the opportunity to select an operation for a continue annotation having a next attribute. In this illustrative example, internal choice 606 includes operation 3. Thus, when a controller comes across a continue annotation, such as continue annotation 602, the controller automatically initiates invocation and processing of the identified operation.

Continue annotation 602 includes condition 608. Condition 608 is a condition that should exist before the operation identified by continues annotation 602 is invoked. Thus, condition 608 should be satisfied before internal choice 606 is invoked. Condition 608 may be any type of condition that must evaluate to a Boolean value.

Figure 8:
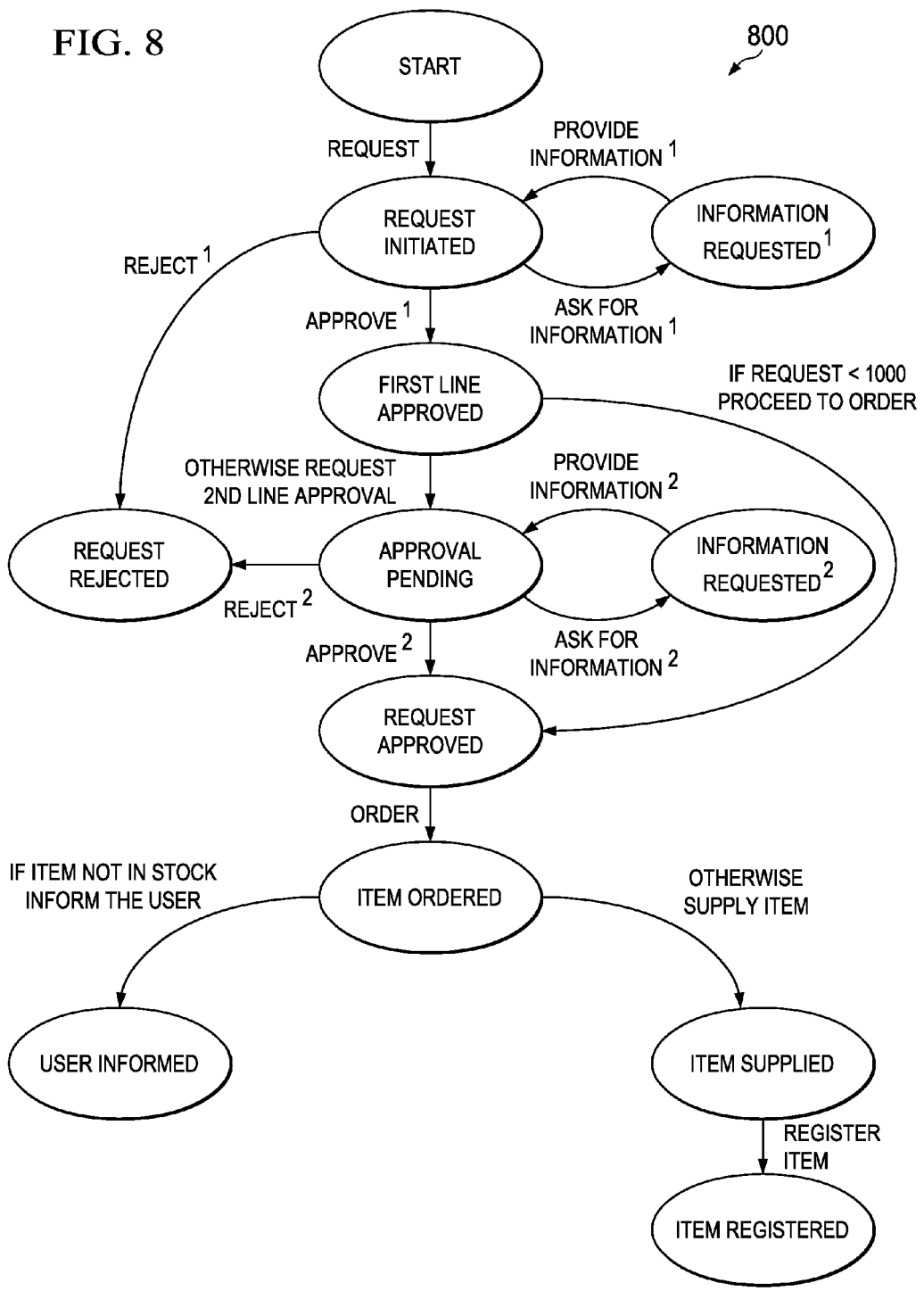
FIG. 8 is a state machine representation of the annotated class in accordance with an illustrative embodiment.

FIGS. 7A-7B are an illustrative annotated class in accordance with an illustrative embodiment. The annotated class, OrderApprovalProcess 700, is an annotated class, such as annotated application code 312 in FIG. 3. OrderApprovalProcess 700 implements a process for approving an order requested by a first user. The approval is provided by a first and second line manager. A corresponding state machine representation of this annotated class is depicted in FIG. 8.

OrderApprovalProcess 700 defines eleven public methods that may be called from a client, such as client 302 in FIG. 3. The methods include methods 702, 704, 706, 708, 710, 712, 714, 716, 718, 720, and 722. Method 702 is a method for enabling a user to submit a request for approval. Method 702 includes a start annotation, such as start annotation 408 in FIG. 4. Consequently, calling method 702 initiates the process for approving a request.

Method 704 is a method for enabling a first line manager to reject the submitted request. If called, method 704 terminates the approval process because method 704 lacks a continue annotation. As such, method 704 is a method, such as method 406 in FIG. 4.

Method 706 is a method for enabling a first line manager to approve the submitted request. Method 706 includes the grouping annotation "@Fork." Consequently, method 706 is a method, such as method 404 in FIG. 4.

Method 708 is a method for enabling the first line manager to request from the user additional information about the submitted request.

Method 710 is a method enabling the user to provide the requested information to the first line manager.

Method 712 is a method for enabling a second line manager to reject the submitted request.

Method 714 is a method enabling the second line manager to approve the submitted request.

Method 716 is a method enabling the second line manager to ask the user to provide additional information regarding the submitted request.

Method 718 is a method for enabling the user to provide the second line manager with the requested information.

Method 720 is a method enabling the process to submit an order of the item identified in the request if the item is available.

Method 722 is a method for registering the ordered item. The process terminates after registering the item because method 722 lacks a continue annotation.

FIG. 8 is a state machine representation of the operation of an annotated class in accordance with an illustrative embodiment. In particular, state machine representation 800 is a graphical depiction of the various states associated with OrderApprovalProcess 700 in FIGS. 7A-7B. The direct correspondence of the state machine concepts and the proposed set of annotations allow a direct mapping from one into the other. Thus, the skeleton of the annotated application code may be generated automatically out of the state machine representation enabling top-down development. Furthermore, the state machine representation may be derived from the annotated application code enabling bottom-up documentation.

Figure 9:
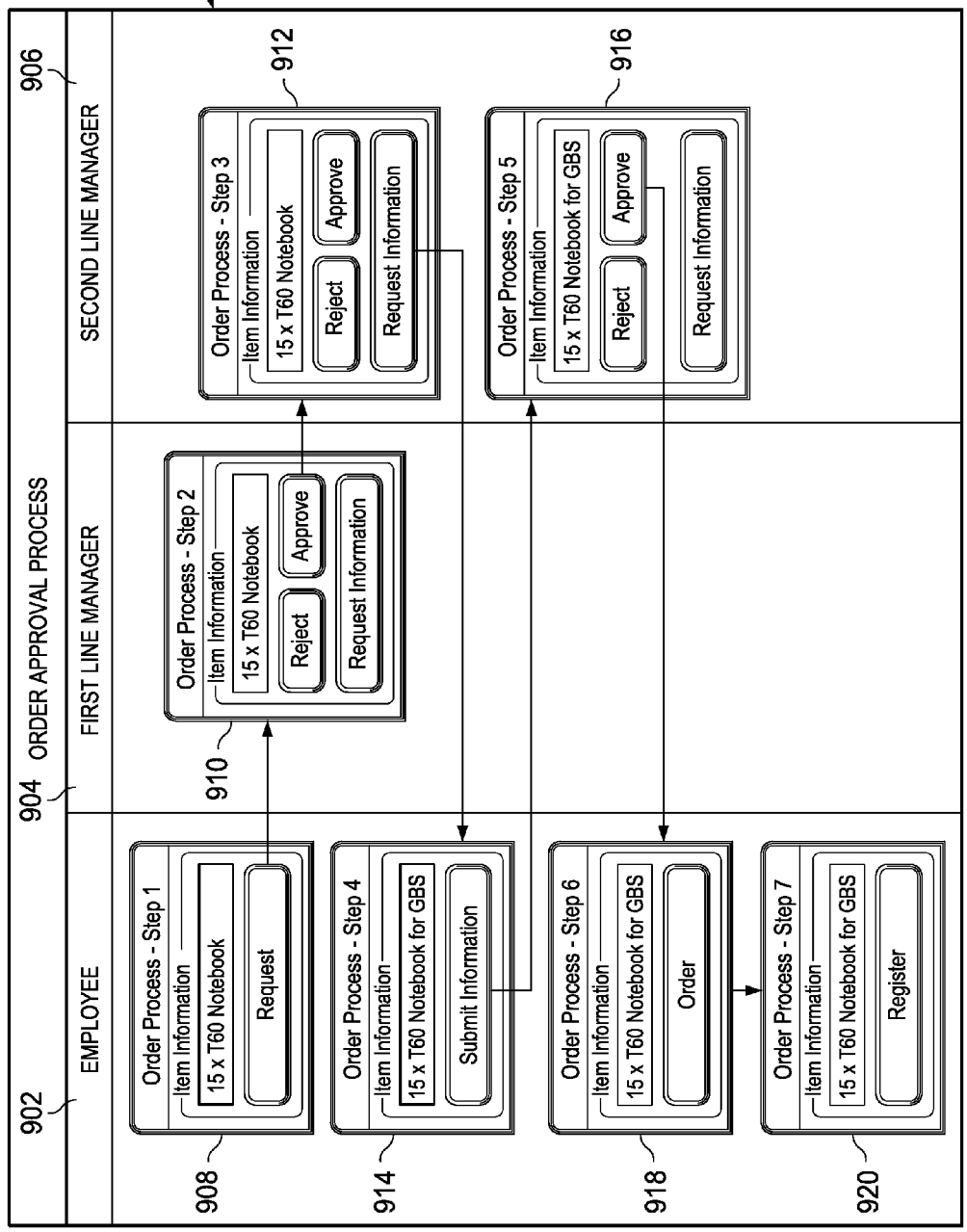
FIG. 9 is a diagram of a sample execution of an annotated class in accordance with an illustrative embodiment.

FIG. 9 is a diagram of a sample execution of an annotated class in accordance with an illustrative embodiment. In particular, the sample execution depicts the process presented by OrderApprovalProcess 700 in FIGS. 7A-7B. Users of the process include employee 902, first line manager 904, and second line manager 906.

In screenshot 908, employee 902 submits a request for an item. In screenshot 910, first line manager 904 receives the submitted request and approves the request. Thereafter, second line manager 906 receives the request and requests additional information in screenshot 912.

In screenshot 914, employee 902 submits the requested additional information. Second line manager 906 receives the additional information and approves the request in screenshot 916.

Employee 902 orders the requested item in screenshot 918. Employee 902 then registers the item in screenshot 920.

Figure 10:
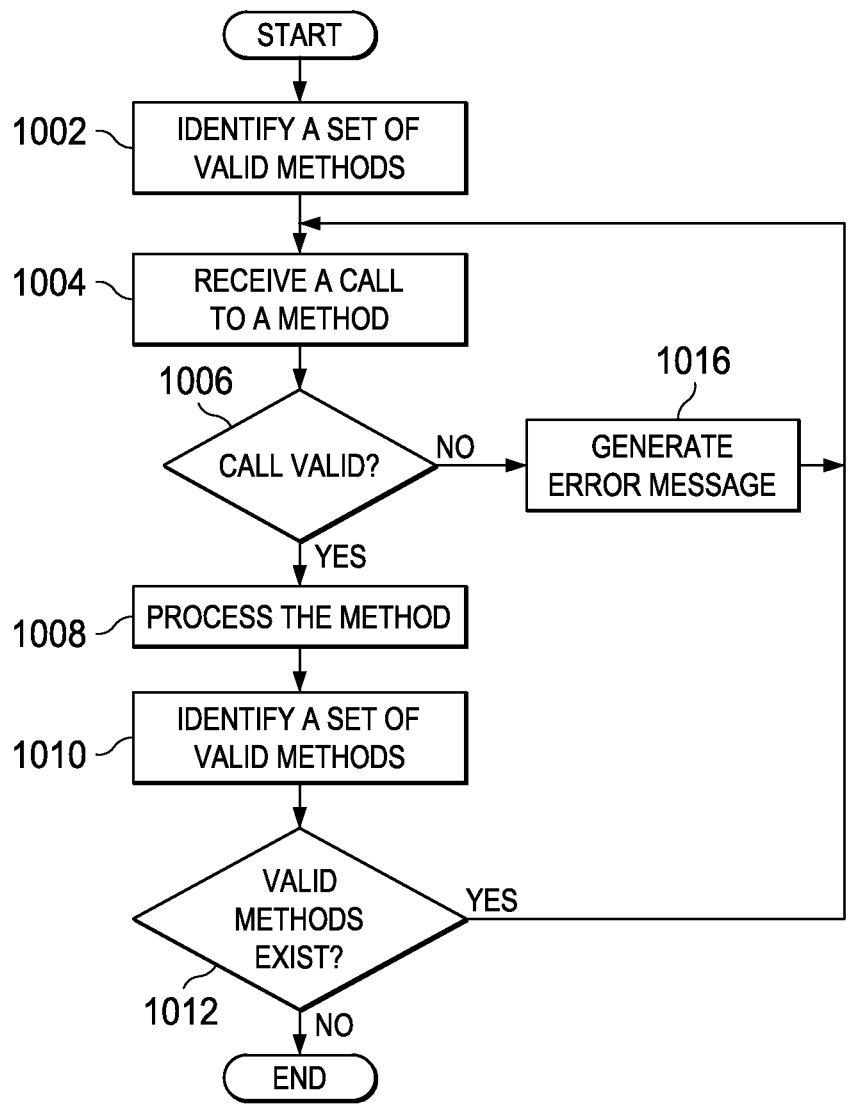
FIG. 10 is a flowchart of a process for executing methods of an annotated application in accordance with an illustrative embodiment.

FIG. 10 is a flowchart of a process for executing methods of an annotated application in accordance with an illustrative embodiment. The process may be performed by a software component, such as controller 322 in FIG. 3.

The process begins by identifying a set of valid methods (step 1002). The process then receives a call to a method (step 1004). The process makes the determination as to whether the call is valid (step 1006).

If the process makes the determination that the call is valid, then the method is processed (step 1008). Thereafter, the process identifies a set of valid methods (step 1010).

The process then makes the determination as to whether valid methods exist (step 1012). If the process makes the determination that valid methods exist, then the process returns to step 1004. However, if the process makes the determination that no valid methods exist, then the process terminates.

Returning now to step 1006, if the process makes the determination that the call is not valid, then the process generates an error message (step 1016), and the process returns to step 1004.

Figure 11:
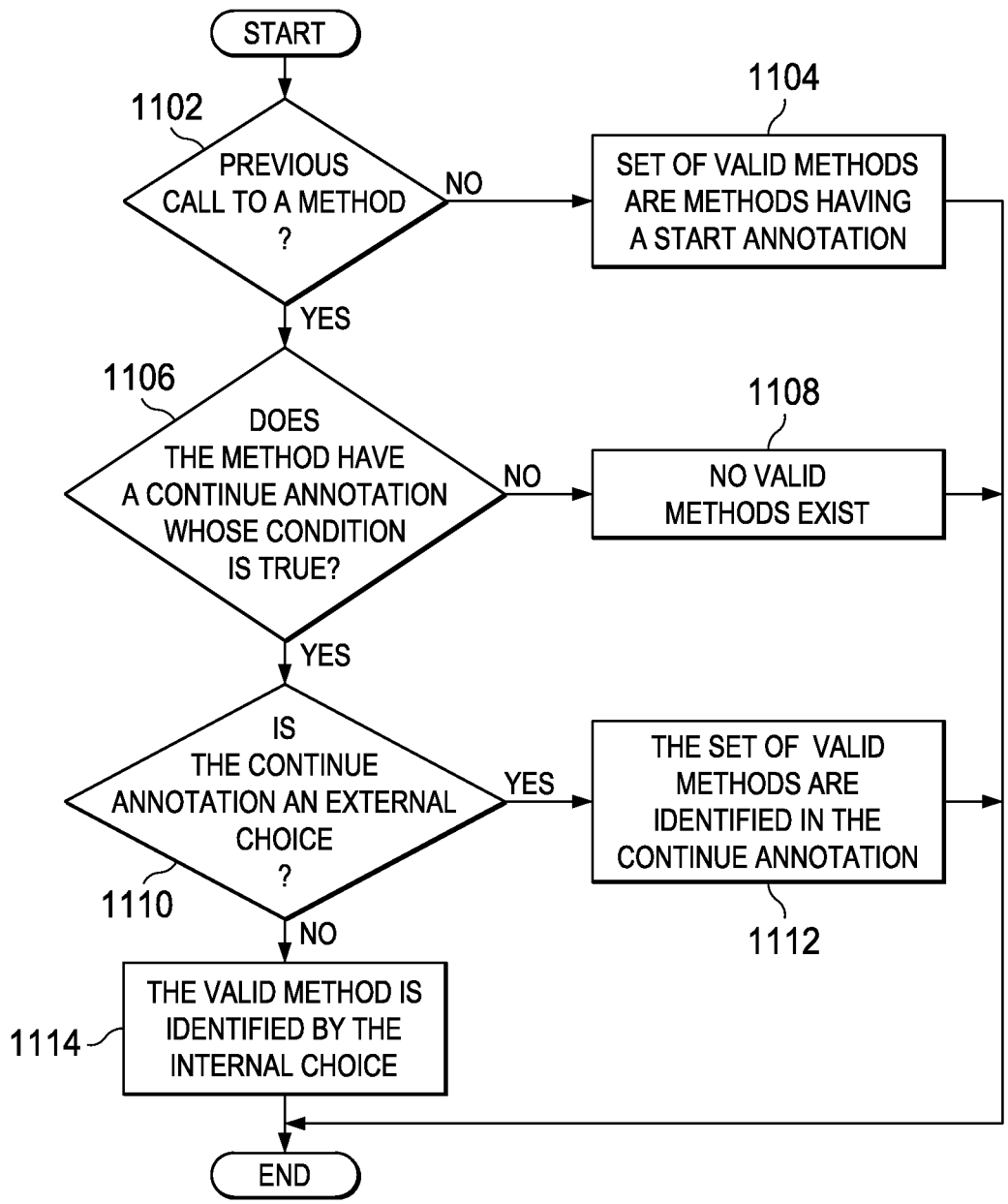
FIG. 11 is a flowchart of a process for checking the validity of a call to a method based on existing annotations in accordance with an illustrative embodiment.

FIG. 11 is a flowchart of a process for checking the validity of a call to a method based on existing annotations in accordance with an illustrative embodiment. The process may be performed by a software component, such as controller 322 in FIG. 3.

The process begins by making the determination as to whether a previous call to a method was made (step 1102). If the process makes the determination that a previous call has not been made, then the set of valid methods are methods having a start annotation (step 1104) and the process terminates. However, if the process makes the determination that a previous call to a method has been made, then the process makes the determination as to whether the method has a continue annotation whose condition is true (step 1106).

If the process makes the determination that the method does not have a continue annotation whose condition is true, then the process determines that no valid methods exist (step 1108), and the process terminates thereafter. However, if the process makes the determination that the method does have a continue annotation whose condition is true, then the process makes the determination as to whether the continue annotation is an external choice (step 1110).

If the process makes the determination that the continue annotation is an external choice, then the process determines that the set of valid methods are identified by the continue annotation (step 1112), with the process terminating thereafter.

If the process makes the determination that the continue annotation is not an external choice, then the continue annotation is an internal choice and the valid method is identified by the internal choice (step 1114), with the process terminating thereafter.

Figure 12:
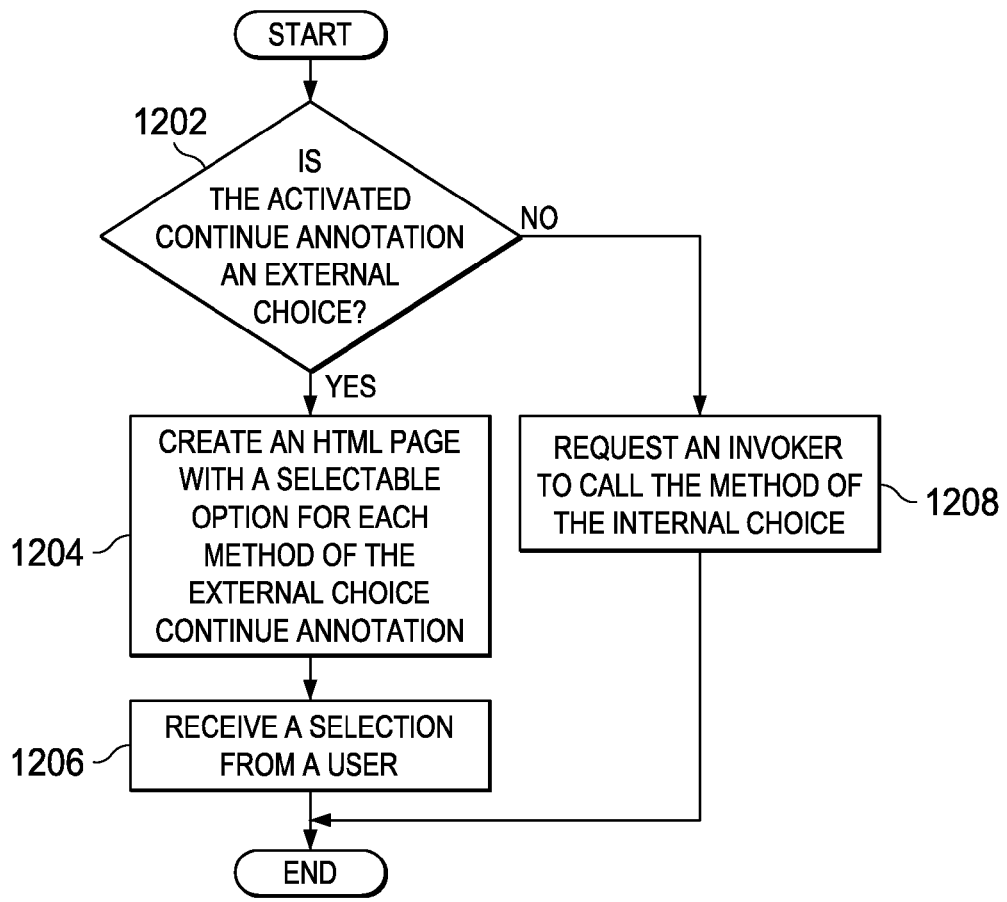
FIG. 12 is a flowchart of steps for processing the invocation of a method by an external caller or an invoker in accordance with an illustrative embodiment.

FIG. 12 is a flowchart of steps for processing the invocation of a method by an external caller or an invoker in accordance with an illustrative embodiment. This processing may be performed by a software component, such as controller 322 in FIG. 3.

The process begins by making the determination as to whether the active continue annotation is an external choice (step 1202). If the process makes the determination that the active continue annotation is an external choice, then the process creates an HTML page with a selectable option for each method of the external choice continue annotation (step 1204). The process then receives a selection from a user (step 1206) and terminates thereafter.

Returning now to step 1202, if the process makes the determination that the active continue annotation is not an external choice, then the process requests an invoker to call the method of the internal choice continue annotation (step 1208), and terminates thereafter.

Figure 13:
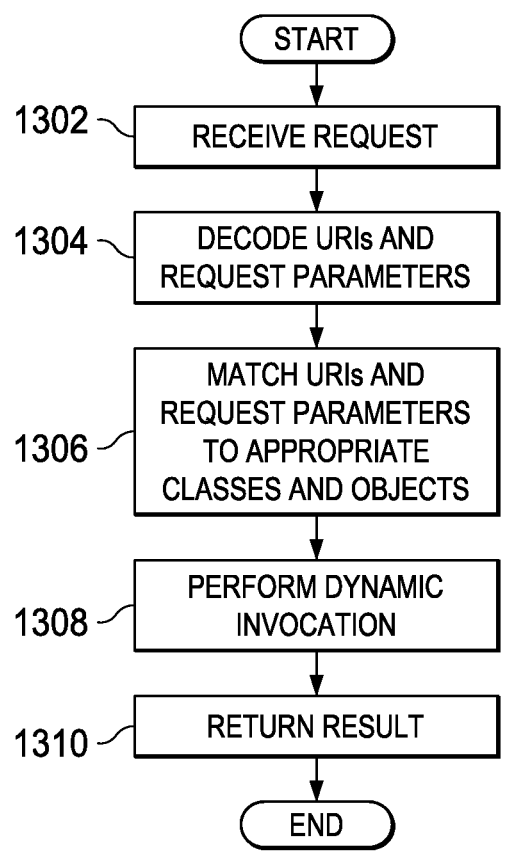
FIG. 13 is a flowchart of a process for invoking valid methods in accordance with an illustrative embodiment.

FIG. 13 is a flowchart of a process for invoking valid methods in accordance with an illustrative embodiment. The process may be performed by a software component, such as invoker 326 in FIG. 3.

The process begins by receiving a controller request (step 1302). The controller request is a request for processing, such as request 324 in FIG. 3. Thereafter, the process decodes uniform resource identifiers and other request parameters (step 1304).

The process then matches uniform resource identifiers and request parameters to appropriate classes and methods (step 1306). Next, the process performs dynamic invocation (step 1308). The process then returns the result (step 1310) and terminates thereafter.

The flowcharts and block diagrams in the different depicted embodiments illustrate the architecture, functionality, and operation of some possible implementations of methods, apparatuses, and computer usable program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for navigating application logic. The process receives a call to invoke a set of methods of annotated application code. The annotated application code includes a set of annotations specifying a selection of the set of methods. The process then invokes a selected method from the set of methods in response to determining that the call is valid according to the set of annotations. Thereafter, the process identifies a subsequent set of valid methods for execution based upon an annotation associated with the selected method.

Using the method and apparatus disclosed herein, a mechanism for introducing sequencing constraints is provided. The sequencing constraints are provided by including a simple set of annotations embedded directly in the implementation logic. No additional artifacts are needed and consistency problems between the business logic and the application logic are not present. The annotations may be used to generate hypertext markup language pages that contain links identifying permissible actions or that may be embedded in application-level responses. Consequently, multiple layers of logic are not necessary for enforcing sequencing constraints.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing application code, the computer implemented method comprising:

configuring, by a web server, a servlet container having annotated application code, an annotation processor that generates a call graph specifying sequencing constraints of the annotated application code, a controller that enforces the sequencing constraints of the annotated application code, and an invoker that matches unique resource identifiers and parameters of requests to appropriate methods, wherein the annotated application code comprises a set of annotations specifying a selection of a set of methods, wherein the set of annotations includes a start annotation that initiates execution of the annotated application code, a continue annotation that identifies a method invoked during the execution of the annotated application code, and a grouping annotation that identifies a method containing a group of two or more continue annotations, each of which identifies a set of operations, and wherein the controller determines which continue annotations from the group of two or more continue annotations are activated based on satisfaction of specified conditions;

receiving, by the web server, a call to invoke a set of methods in a web page;

determining, by the web server, that the call is valid according to the set of annotations and the call graph using the controller;

responsive to the web server determining that the call is valid according to the set of annotations and the call graph, invoking, by the web server, a selected method from the set of methods using the invoker;

identifying, by the web server, a subsequent set of valid methods of the set of methods in the web page for execution based upon an annotation associated with the selected method of the set of methods in the web page using the controller; and responsive to the web server receiving a subsequent call to a method of the annotated application code lacking a continue annotation, terminating, by the web server, the execution of the annotated application code.

2. The computer implemented method of claim 1, further comprising:

updating, by the web server, a representation of a navigation state of the annotated application code using annotations of subsequently called methods.

3. The computer implemented method of claim 1, further comprising:

decoding a uniform resource identifier and at least one request parameter;

matching the uniform resource identifier and the request parameter to an appropriate class and method;

responsive to invoking the selected method from the set of methods, determining that the method is an external choice continue annotation; and responsive to determining that the method is the external choice continue annotation, creating a page with selectable options for each method of the external choice continue annotation;

wherein the call graph includes a set of sequencing constraints and a navigation state.

4. The computer implemented method of claim 1, wherein the call is valid in response to the call being an initial call to the annotated application code, and wherein the selected method comprises the start annotation.

5. The computer implemented method of claim 1, wherein the call is valid in response to the call being a subsequent call to a set of methods identified by annotations on the selected method.

6. The computer implemented method of claim 1, further comprising:

responsive to determining that the call is invalid, returning an error message.

7. The computer implemented method of claim 1, wherein the selected method comprises at least one of the start annotation, the continue annotation, and the grouping annotation.

8. The computer implemented method of claim 7, wherein the continue annotation comprises at least one of an external choice and an internal choice.

9. A computer program product comprising:

a non-transitory computer usable storage device including computer usable program code stored thereon for processing annotated application code, the computer program product comprising:

computer usable program code for configuring, by a web server, a servlet container having annotated application code, an annotation processor that generates a call graph specifying sequencing constraints of the annotated application code, a controller that enforces the sequencing constraints of the annotated application code, and an invoker that matches unique resource identifiers and parameters of requests to appropriate methods, wherein the annotated application code comprises a set of annotations specifying a selection of a set of methods, wherein the set of annotations includes a start annotation that initiates execution of the annotated application code, a continue annotation that identifies a method invoked during the execution of the annotated application code, and a grouping annotation that identifies a method containing a group of two or more continue annotations, each of which identifies a set of operations, and wherein the controller determines which continue annotations from the group of two or more continue annotations are activated based on satisfaction of specified conditions;

computer usable program code for receiving, by the web server, a call to invoke a set of methods in a web page;

computer usable program code for determining, by the web server, that the call is valid according to the set of annotations and the call graph using the controller;

computer usable program code, responsive to the web server determining that the call is valid according to the set of annotations and the call graph, for invoking, by the web server, a selected method from the set of methods using the invoker;

computer usable program code for identifying, by the web server, a subsequent set of valid methods of the set of methods in the web page for execution based upon an annotation associated with the selected method of the set of methods in the web page using the controller; and computer usable program code, responsive to the web server receiving a subsequent call to a method of the annotated application code lacking a continue annotation, for terminating, by the web server, the execution of the annotated application code.

10. The computer program product of claim 9, further comprising:

computer usable program code for updating a representation of a navigation state of the annotated application code using annotations of subsequently called methods.

11. The computer program product of claim 9, further comprising:

computer usable program code for decoding a uniform resource identifier and at least one request parameter;

computer usable program code for matching the uniform resource identifier and the request parameter to an appropriate class and method;

computer usable program code, responsive to invoking the selected method from the set of methods, for determining that the method is an external choice continue annotation; and computer usable program code, responsive to determining that the method is the external choice continue annotation, for creating a page with selectable options for each method of the external choice continue annotation;

wherein the call graph includes a set of sequencing constraints and a navigation state.

12. The computer program product of claim 9, wherein the call is valid in response to the call being a subsequent call to a set of methods identified by annotations on the selected method.

13. The computer program product of claim 9, further comprising:

computer usable program code for returning an error message in response to determining that the call is invalid.

14. The computer program product of claim 9, wherein the selected method comprises at least one of the start annotation, the continue annotation, and the grouping annotation.

15. The computer program product of claim 14, wherein the continue annotation comprises at least one of an external choice and an internal choice.

16. An apparatus for processing application code, the apparatus comprising:

one or more processors, one or more computer readable memories, and one or more computer readable storage devices;

computer readable program code, stored on the one more computer readable storage devices for execution by the one or more processors via the one or more computer readable memories for configuring, by a web server, a servlet container having annotated application code, an annotation processor that generates a call graph specifying sequencing constraints of the annotated application code, a controller that enforces the sequencing constraints of the annotated application code, and an invoker that matches unique resource identifiers and parameters of requests to appropriate methods, wherein the annotated application code comprises a set of annotations specifying a selection of a set of methods, wherein the set of annotations includes a start annotation that initiates execution of the annotated application code, a continue annotation that identifies a method invoked during the execution of the annotated application code, and a grouping annotation that identifies a method containing a group of two or more continue annotations, each of which identifies a set of operations, and wherein the controller determines which continue annotations from the group of two or more continue annotations are activated based on satisfaction of specified conditions;

computer readable program code, stored on the one more computer readable storage devices for execution by the one or more processors via the one or more computer readable memories for receiving, by the web server, a call to invoke a set of methods in a web page;

computer readable program code, stored on the one more computer readable storage devices for execution by the one or more processors via the one or more computer readable memories for determining, by the web server, that the call is valid according to the set of annotations and the call graph using the controller;

computer readable program code, stored on the one more computer readable storage devices for execution by the one or more processors via the one or more computer readable memories, responsive to the web server determining that the call is valid according to the set of annotations and the call graph, for invoking, by the web server, a selected method from the set of methods using the invoker;

computer readable program code, stored on the one more computer readable storage devices for execution by the one or more processors via the one or more computer readable memories for identifying, by the web server, a subsequent set of valid methods of the set of methods in the web page for execution based upon an annotation associated with the selected method of the set of methods in the web page using the controller; and computer readable program code, stored on the one more computer readable storage devices for execution by the one or more processors via the one or more computer readable memories, responsive to the web server receiving a subsequent call to a method of the annotated application code lacking a continue annotation, for terminating, by the web server, the execution of the annotated application code.

17. The apparatus of claim 16, further comprising:

computer readable program code, stored on the one more computer readable storage devices for execution by the one or more processors via the one or more computer readable memories for decoding a uniform resource identifier and at least one request parameter;

computer readable program code, stored on the one more computer readable storage devices for execution by the one or more processors via the one or more computer readable memories for matching the uniform resource identifier and the request parameter to an appropriate class and method;

computer readable program code, stored on the one more computer readable storage devices for execution by the one or more processors via the one or more computer readable memories, responsive to invoking the selected method from the set of methods, for determining that the method is an external choice continue annotation; and computer readable program code, stored on the one more computer readable storage devices for execution by the one or more processors via the one or more computer readable memories for responsive to determining that the method is the external choice continue annotation, creating a page with selectable options for each method of the external choice continue annotation;

wherein the call graph includes a set of sequencing constraints and a navigation state.

* * * * *